United States Patent [19]
Hendrickson, Jr.

[11] 3,991,440
[45] Nov. 16, 1976

[54] FOOD PELLET FORMER
[75] Inventor: Jay D. Hendrickson, Jr., Astoria, Oreg.
[73] Assignee: Castle & Cooke, Inc., Honolulu, Hawaii
[22] Filed: Oct. 25, 1974
[21] Appl. No.: 517,855

[52] U.S. Cl. .................................. 17/32; 425/246
[51] Int. Cl.² ......................................... A22C 7/00
[58] Field of Search ................. 17/32; 425/246, 259

[56] References Cited
UNITED STATES PATENTS

| | | | |
|---|---|---|---|
| 3,122,869 | 3/1964 | Miller et al. | 17/32 |
| 3,355,765 | 12/1967 | Hendry | 425/246 |
| 3,691,594 | 9/1972 | Klein | 17/32 |

*Primary Examiner*—Warner H. Camp
*Attorney, Agent, or Firm*—Klarquist, Sparkman, Campbell, Leigh, Hall & Whinston

[57] ABSTRACT

A filling spout supplies a food slurry under pressure to one portion of a rotating drum having molding cavities through its periphery to fill the cavities. An ejector inside the drum applies hot fluid under pressure to the inner ends of the pellets in the cavities to eject them from the drum. The drum is mounted on a bearing rotatable on and slidable along a hollow arbor serving as a conduit for the hot fluid, and the drum is slidable between an operating position adjacent the spout and the ejector, and a cleaning position completely removed from the spout and the ejector.

11 Claims, 5 Drawing Figures

FOOD PELLET FORMER

DESCRIPTION

This invention relates to a food pellet former, and has for an object thereof the provision of a new and improved food pellet former.

Another object of the invention is to provide a food pellet former which molds a thick food slurry into bite size pellets.

Another object of the invention is to provide a food pellet former including a rotated drum having molding cavities therethrough into which a food slurry is forced at one point in its rotation and including an ejector applying fluid to the inner periphery of the drum at a second point in its rotation to eject the pellets of the slurry out of the holes.

A further object of the invention is to provide a food pellet former wherein a food slurry is compressed into peripheral holes in a drum to form pellets which are ejected from the holes by fluid under pressure supplied to the interior of the drum.

Another object of the invention is to provide a food pellet former including a series of moving cavities into which a viscous slurry is fed and the formed shapes in the cavities are ejected gently from the cavities by a fluid.

Another object of the invention is to provide a former which forms uniform food pellets from food slurries varying in viscosity, adhesiveness, compressibility, temperature and composition.

IN THE DRAWINGS

Figure 1:
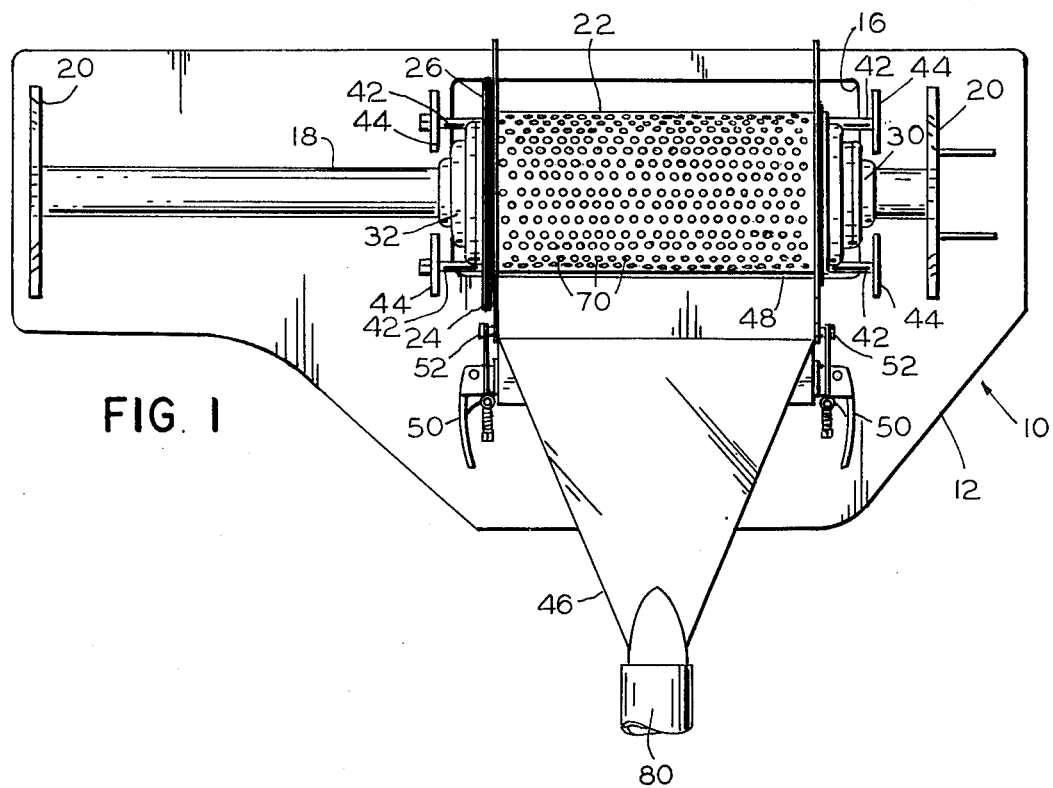
FIG. 1 is a fragmentary, top plan view of a food pellet former forming one embodiment of the invention.
Figure 2:
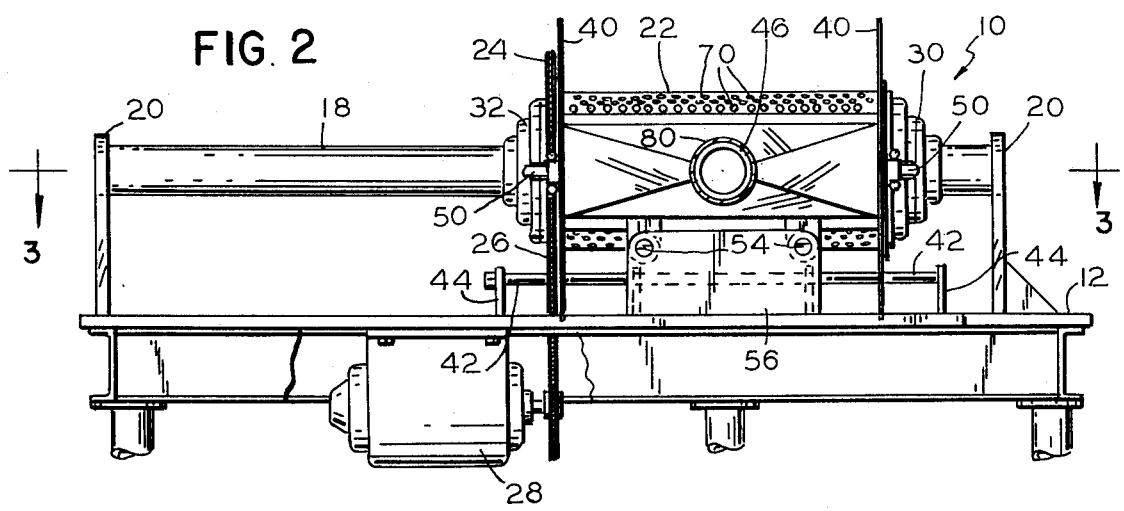
FIG. 2 is a fragmentary, partially sectional rear elevation view of the food pellet former of FIG. 1.
Figure 3:
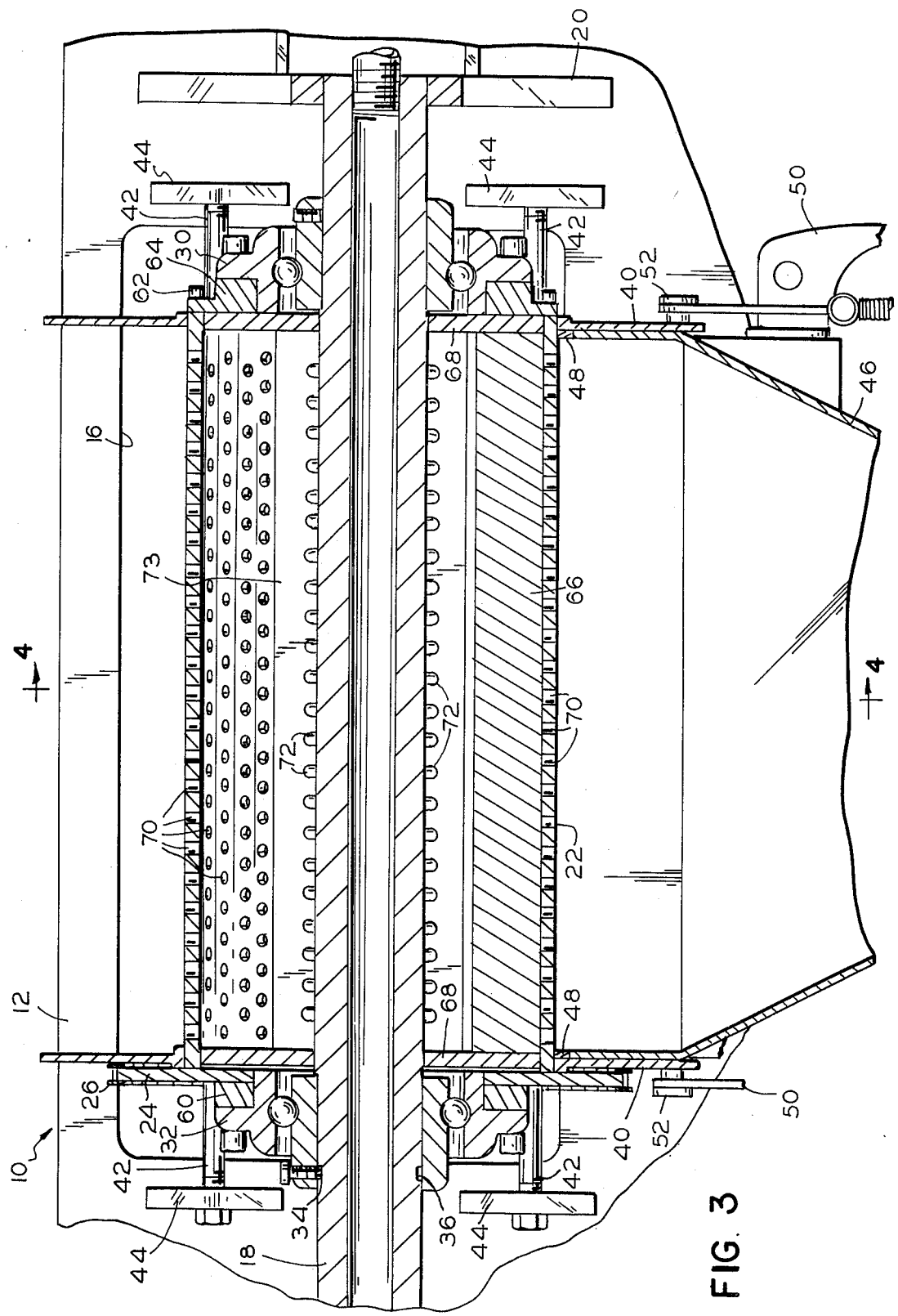
FIG. 3 is an enlarged, fragmentary, horizontal sectional view taken along line 3—3 of FIG. 2.
Figure 4:
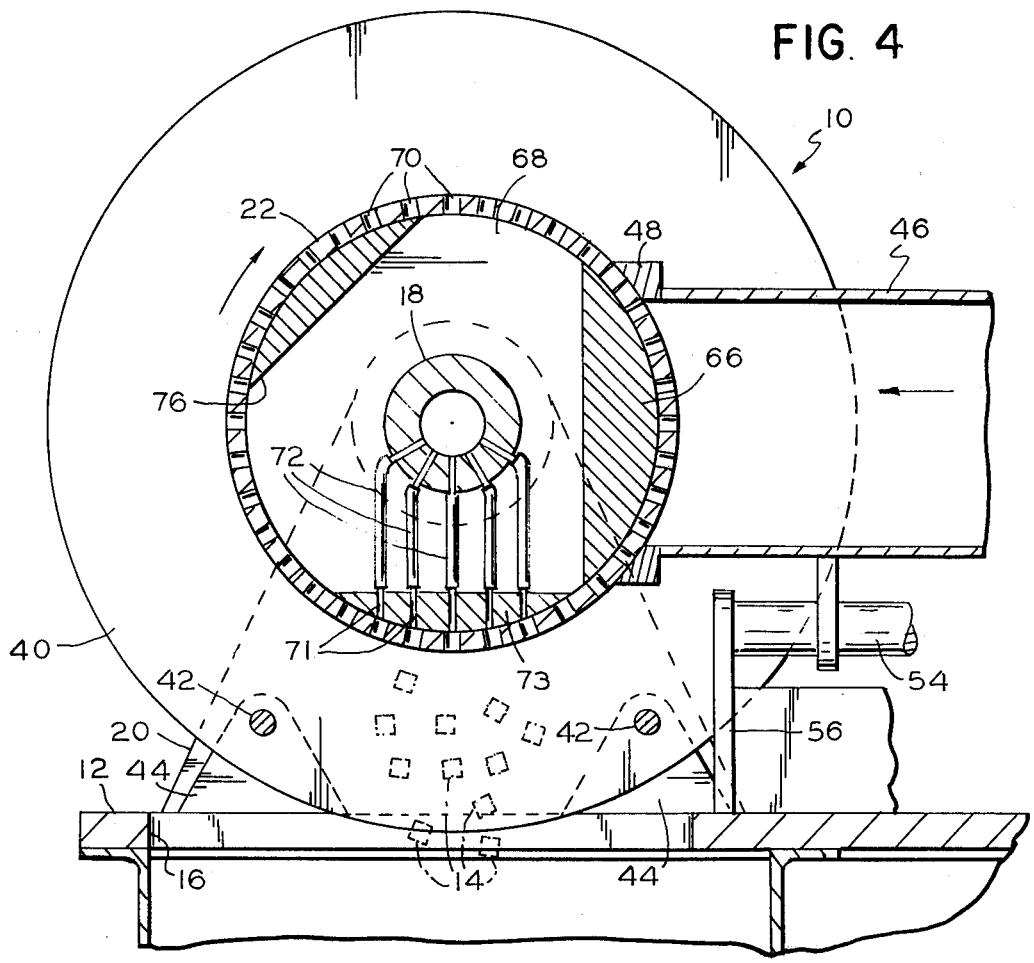
FIG. 4 is an enlarged, fragmentary, vertical sectional view taken along line 4—4 of FIG. 3; and, FIG. 5 is an enlarged, fragmentary vertical sectional view of the food pellet former of FIG. 1.
Figure 5:
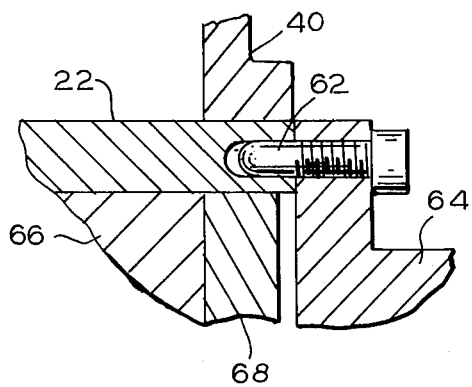

Referring now in detail to the drawings, there is shown therein a food pellet former 10 forming one specific embodiment of the invention. The former 10 includes a table or base 12 (FIGS. 1 and 2) and forms and discharges food pellets 14 downwardly through an opening 16 in the base. A fixed, tubular axle or arbor 18 is mounted rigidly on the base by plates 20 fixed to the base and arbor. A cylindrical forming drum 22 having a sprocket 24 bolted to one end thereof is rotated by a chain drive 26 and a motor 28 mounted on the base. The drum is rotatably mounted on the axle 18 by an axially fixed bearing 30 and a bearing 32 slidable along the axle. The bearing 32 is secured in its operating position by a removable pin 34 (FIG. 3) adapted to enter a blind bore 36 in the axle 18. A pair of rings 40 are supported on rods 42 mounted on ears 44 on the base, and the drum is rotatable in the rings. A filling spout 46 having a thick, arcuate, brass mouth 48 is releasably fastened to the rings and closely and sealingly engages a side of the drum. Toggle clamps 50 engage hooks 52 on the rings to releasably hold the filling spout in position. The filling spout is slidably mounted on guide rods 54 (FIG. 4) supported by upright plates 56 fastened to the base. The spout is movable along the guide rods 54 between an operating position as shown in the drawings and a retracted position away from the drum.

The drum 22 is fixed to the sprocket 24 (FIG. 3), which is bolted to spacer ring 60 and the outer race of the bearing 32. The drum is splined by round ended cap screw pins 62 to spacer ring 64 fixed to the bearing 30. An arcuate core 66 supported by mounting discs 68 on the axle closes the inner ends of outwardly tapered, generally cylindrical pellet molding bores or cavities 70, which are adjacent the mouth 48 of the filling spout 46. Hot water under pressure supplied to one end of the axle (the other end being plugged) flows through pipes 72 to bores 71 in bottom, ejecting portion 73 of the core 66 to eject the pellets 14 from the bores at the bottom portion of the drum. The pellets ejected from the drum drop into a hot water bath. For cleaning, the spout 46 can be unhooked and slid back, and the drum 22 can be slid with the bearing assembly 32 along the axle 18 to fully expose the core 66. A balancing core 76 has a short arcuate portion bearing against the portion of the drum about 180° from the core 66. If desired, instead of one end of the axle being plugged, parallel hot water pipes can be connected to both ends of the axle.

OPERATION

A tacky, viscous mass of a formable food, such as, for example, farinaceous material or uncooked flesh of fish, chicken, liver, or other meat, or a mixture thereof, is pumped by a pump (not shown) through a hose 80 (FIGS. 1 and 2) to keep the spout 46 filled with the mass under pressure of, for example, two to sixty pounds per square inch. The drum is continuously rotated in a clockwise direction, as viewed in FIG. 4, and the food is forced into and fills the bores 70. After the filled bores are advanced past the spout, they pass outlets of the ejection bores 71 and hot water supplied to the bores 71 under pressure ejects the pellets from the bores 70. The water is preferably fairly hot, 180°, for example, and is under a high enough pressure to eject the pellets, a pressure of from one to fifteen pounds per square inch being sufficient. The bores 70 are mounted in staggered rows and the bores 71 are mounted so that at least two of the ejecting bores 71 are fully aligned with one of the molding bores 70 as the latter bore is moved past the ejecting portion 72 of the core 66. The pellets so formed are uniform in shape, size and density and are completely integral.

The drum 22 with the sprocket 24 and bearing assembly 32 may be slid back out of contact with the spout 46, rings 40, and cores 66 and 76, after the spout 46 is unhooked and slid back. This opens the entire apparatus for cleaning or maintenance. It will be understood that, while the molding cavities 70 shown are slightly tapered and generally cylindrical, a multitude of sizes and shapes are possible.

What is claimed is:
 1. In a food pellet former,
   filling spout means supplied with a pressurized plastic mass of food to be molded,
   a drum having molding cavities extending generally radially therethrough,
   mounting means mounting the drum rotatably and with an exterior portion of the drum in engagement with the filling spout means,
   means for rotating the drum past the filling spout means, whereby the cavities are filled with the food to form pellets, core means engaging the portion of the inner periphery of the drum at the filling spout means for closing the cavities being filled by the filling spout means, and ejecting means for pushing the pellets out of the cavities after the cavities have been revolved past the filling spout means, the mounting means including an arbor member and bearing means slidable along the arbor member and rotatably mounting the drum thereon.

2. The food pellet former of claim 1 including a drum-driving sprocket mounted on the bearing means and connected to the drum.

3. The food pellet former of claim 2 including second bearing means fixed to the arbor member against movement along the arbor member and detachably connected to the drum.

4. The food pellet former of claim 3 including means mounting the filling spout means for movement between an operating position in which the filling spout means sealingly engages the drum and a retracted position in which the filling spout means is spaced from the drum, and releasable latch means for holding the filling spout means in its operating position.

5. In a food pellet former, base means, an arbor member, means supporting the arbor member in a horizontal position on the base means in an elevated position, a pair of discs fixed to the base means in spaced apart positions, a drum having perforations mounted rotatably on the discs, filling spout means engaging one side of the exterior of the drum for injecting food into the perforations, core means having a first portion engaging the interior surface of the portion of the drum at the filling spout means, means for rotating the drum past the filling spout means, ejecting means for ejecting pellets from the perforations in the drum, and bearing means separate from the discs and on the arbor and mounting the drum rotatably on the discs.

6. The food pellet former of claim 5 wherein the bearing means comprises a first bearing at one side of one of the discs and a second bearing at the opposite side of the other disc.

7. The food pellet former of claim 6 wherein the first bearing is slidable along the arbor and the second bearing is held against movement along the arbor, and including means fixing the first bearing to the drum and connecting means detachably connecting the drum to the second bearing.

8. The food pellet former of claim 7 wherein the connecting means comprises dowel means.

9. In a food pellet former, filling spout means supplied with a pressurized plastic mass of food to be molded, a drum having molding cavities extending generally radially therethrough, mounting means mounting the drum rotatably and with an exterior portion of the drum in engagement with the filling spout means, means for rotating the drum past the filling spout means, whereby the cavities are filled with the food to form pellets, core means engaging the portion of the inner periphery of the drum at the filling spout means for closing the cavities being filled by the filling spout means, and ejecting means for pushing the pellets out of the cavities after the cavities have been revolved past the filling spout means, the mounting means including means mounting the drum for longitudinal sliding movement between an operating position covering the core means and a cleaning position exposing the core means.

10. In a food pellet former, filling spout means supplied with a pressurized plastic mass of food to be molded, a drum having molding cavities extending generally radially therethrough, mounting means mounting the drum rotatably and with an exterior portion of the drum in engagement with the filling spout means, means for rotating the drum past the filling spout means, whereby the cavities are filled with the food to form pellets, core means engaging the portion of the inner periphery of the drum at the filling spout means for closing the cavities being filled by the filling spout means and also forming ejecting means for pushing the pellets out of the cavities after the cavities have been revolved past the filling spout means, the core means including an ejecting portion engaging the inner surface of the drum and having passage means opening to the inner periphery of the drum and means for supplying fluid under pressure to the passage means, the mounting means and the ejecting means including hollow axle means mounting the drum and supplying the fluid under pressure to the core means, the mounting means including bearing means mounting the drum rotatably on the axle means and slidable along the axle means with the drum to move the drum between an operating position engaging the spout means and the core means and an open, cleaning position in which the drum is out of engagement with the spout means and the core means.

11. In a food pellet former, a drum having holes extending therethrough, a hollow arbor extending axially through the drum, bearing means mounting the drum rotatably on the arbor, a plurality of arcuate core means mounted on the arbor and in the drum and engaging circumferentially spaced arcuate sectors of the drum, means for rotating the drum around the core means, means outside the drum for pressing viscous material into the holes in the drum at one of the arcuate core means to form pellets, a second one of the arcuate core means having radial fluidic passages therethrough, means for supplying an ejecting fluid to the hollow arbor, and passage means connecting the interior of the hollow arbor to the passages to eject the pellets from the holes in the drum.

* * * * *